United States Patent [19]

Sorola

[11] Patent Number: 5,461,820
[45] Date of Patent: Oct. 31, 1995

[54] SWIVEL CONSTRUCTION

[76] Inventor: Bret S. Sorola, 1832 W. Norfolk Dr. #2, Essexville, Mich. 48732

[21] Appl. No.: 252,343

[22] Filed: Jun. 1, 1994

[51] Int. Cl.$^6$ .................................................. A01K 91/00
[52] U.S. Cl. ................................ 43/43.1; 59/95; 403/78
[58] Field of Search ........................ 43/43.1; 403/78, 403/306; 59/95

[56] References Cited

U.S. PATENT DOCUMENTS

| | | |
|---|---|---|
| 183,750 | 10/1876 | Clifford .................................. 59/95 |
| 913,056 | 2/1909 | Rounds . |
| 1,766,532 | 6/1930 | Pflueger . |
| 2,466,243 | 4/1949 | Johnson ................................. 43/43.1 |
| 2,519,460 | 8/1950 | Hansen .................................. 403/78 |
| 3,490,799 | 1/1970 | Shreeve ................................. 403/78 |
| 4,195,798 | 4/1980 | Costantino ............................. 403/78 |
| 4,308,419 | 12/1981 | Fredriksson ........................... 59/95 |
| 4,369,551 | 1/1983 | Heredia . |
| 4,600,331 | 7/1986 | Gray . |
| 4,633,609 | 1/1987 | Brown . |
| 4,669,907 | 6/1987 | Patton . |
| 5,150,539 | 9/1992 | Sorola . |

*Primary Examiner*—Kurt Rowan
*Attorney, Agent, or Firm*—Learman & McCullouch

[57] ABSTRACT

A swivel for coupling a fishing lure to a fishing line comprises a body rotatable about an axis and having one end accommodated in a cavity of a housing. A journal within the housing encircles the body and has latching fingers which extend radially outward of the axis into latching engagement with keepers on the housing. The journal confronts a retainer having projections which are operable in response to the application of tensile force on the swivel to resist movement of the latching fingers in a direction to release them from the keepers.

15 Claims, 3 Drawing Sheets

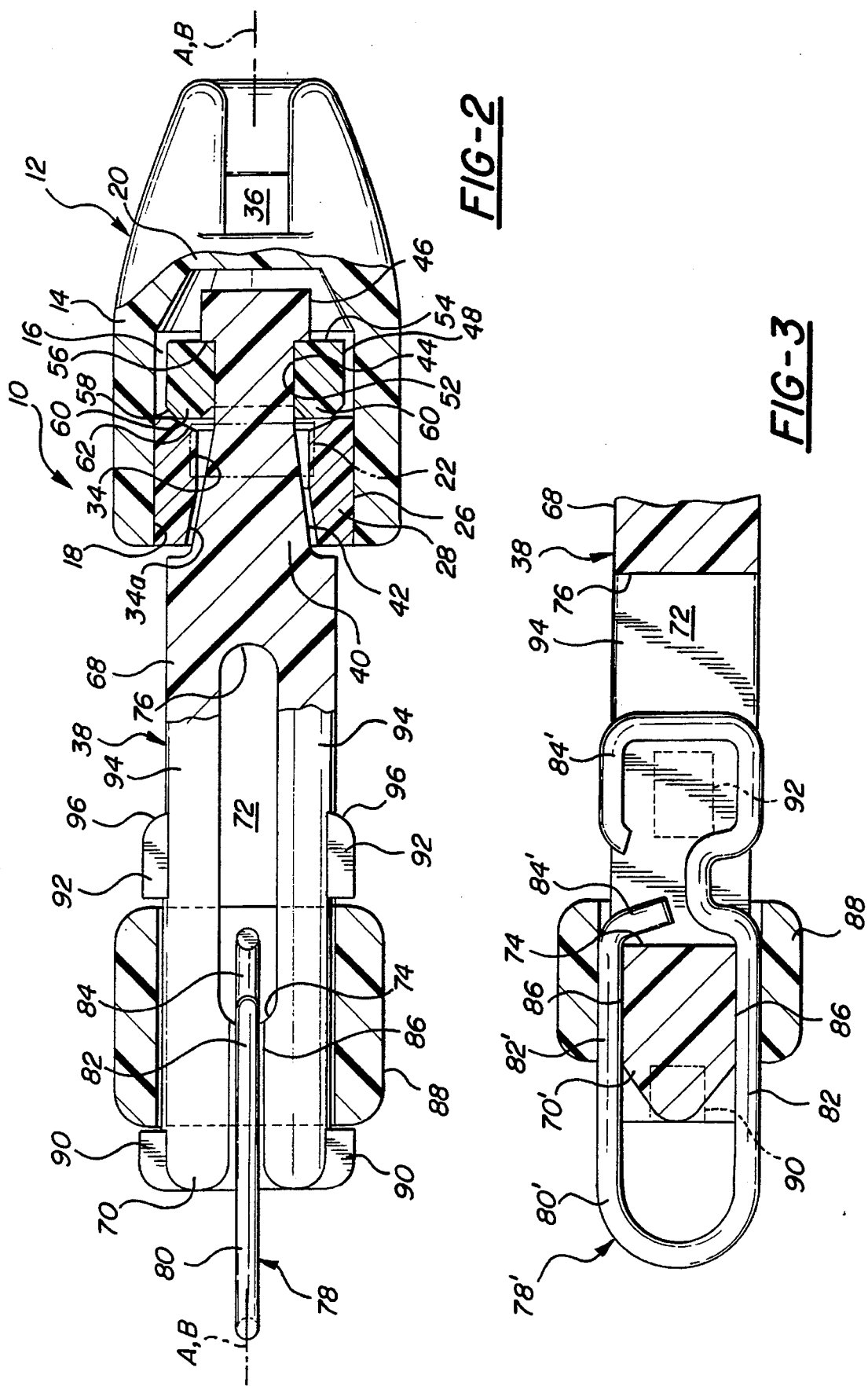

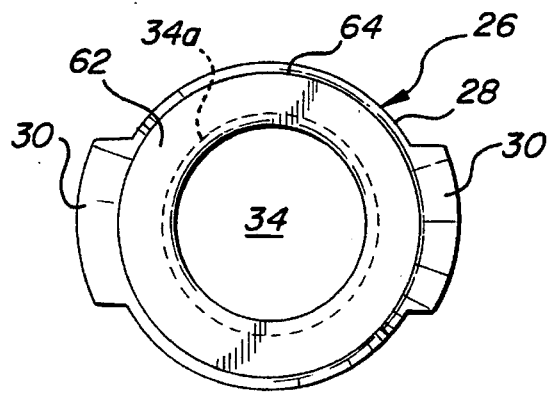
FIG-4
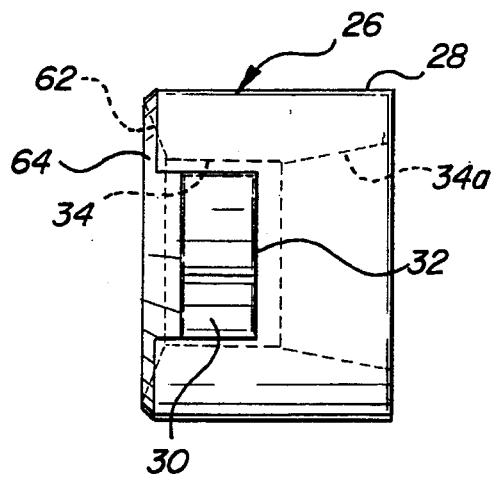
FIG-5
FIG-6
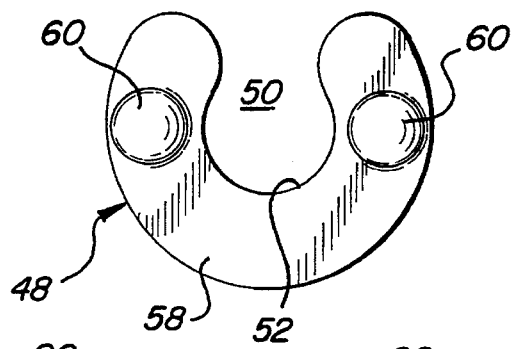
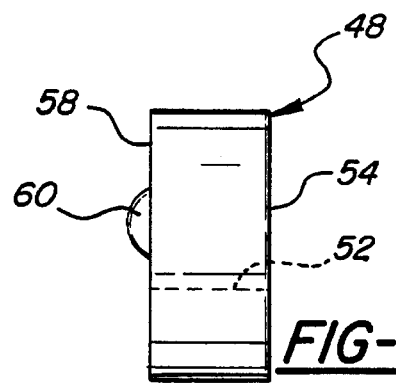
FIG-7
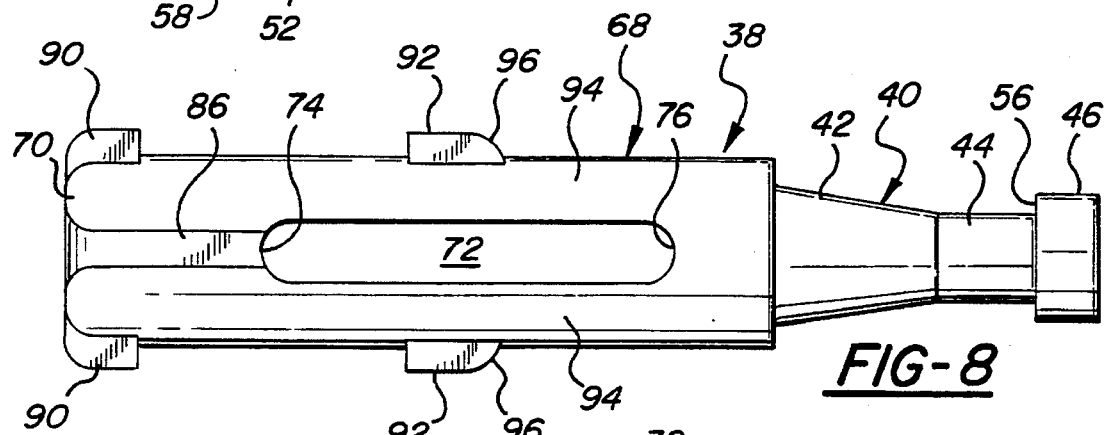
FIG-8
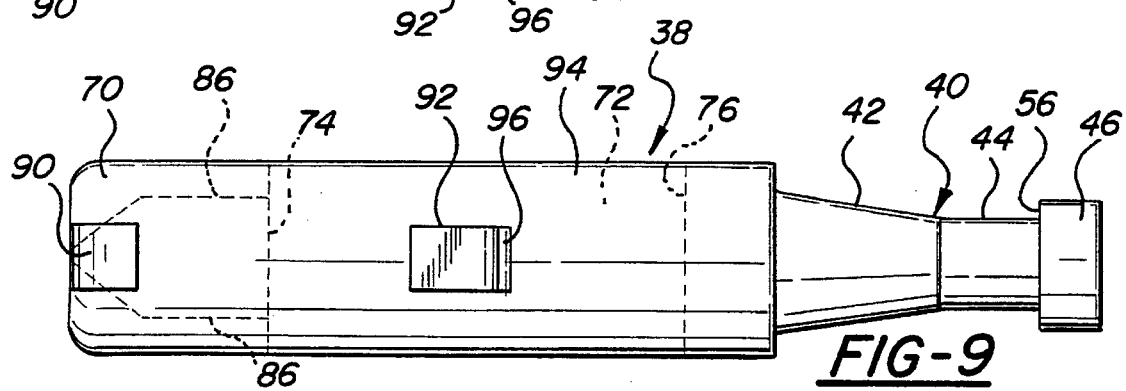
FIG-9

SWIVEL CONSTRUCTION

This invention relates to a swivel construction of the kind adapted to couple a fishing tackle element, such as a lure, to a fishing line to allow the lure to rotate without twisting the line.

BACKGROUND OF THE INVENTION

The prior art contains many examples of swivels by means of which hooks, lures, minnows, and other forms of bait may be secured to a fishing line in such manner as to permit the bait to rotate during its movement through the water without causing undesirable twisting of the fishing line. The known swivels conventionally comprise a body composed of two or more relatively rotatable parts formed of a corrosion resistant material, such as brass, and provided at their opposite ends with eyes for attachment to the line and tackle element.

U.S. Pat. No. 5,150,539 discloses an all plastic swivel construction having snapped together components. The swivel includes a body having bifurcated cavities at its ends in which the spindles of a pair of connecting members are accommodated. Each cavity also accommodates a journal snapped into engagement with the body member and supporting the spindles for rotation in the cavity. A retainer bushing is provided on each spindle to limit the axial movement of the connector members. The journal and retainer pairs have confronting bearing surfaces that are engageable when the swivel is placed under tension. The bearing surface of the retainer is provided with hemispherical projections for making point contact with the opposed bearing face of the journal.

Apparatus constructed in accordance with the invention contributes an improvement in the performance of the patented construction and a reduction in its manufacture cost.

SUMMARY OF THE INVENTION

A swivel constructed according to the invention comprises a housing having a cavity at one end through which the spindle of an elongate body extends. Swiveable coupling elements in the form of a journal and retainer mount the body for rotation in the cavity and have axially opposed bearing surfaces arranged to confront one another when the swivel is subjected to tensile force. At least one of the bearing surfaces is conical and the other is of such configuration as to expand the conical surface radially outwardly when the swivel is subjected to tensile force.

Until such time as the swivel is subjected to tensile force the journalling of the body is loose and minimizes frictional forces between the housing and the journal components.

The journal is retained in the housing by cooperable latch fingers on the journal which engage keepers on the housing. When the swivel is subjected to tensile force the radially outward expansion of the one conical surface acts on the latch fingers and resists disengagement of the latch fingers from the keepers. The components of the swivel are constructed so as to be snap-fitted together by simply extending the preassembled body, retainer, and journal into the cavity of the housing through an opening in the housing. This feature simplifies the construction and assembly of the various components and achieves a savings in cost, labor, and time.

THE DRAWINGS

A presently preferred embodiment of the invention is disclosed in the accompanying drawing, wherein:

FIG. 2 is a sectional view taken on the line 2—2 of FIG. 1;

FIG. 3 is a fragmentary top plan view showing an alternative embodiment of the spring clip;

FIG. 4 is an enlarged elevational view of a journal;

FIG. 5 is a side elevational view of the retainer;

FIG. 6 is an enlarged elevational view of a retainer;

FIG. 7 is a side elevational view of the retainer;

FIG. 8 is an enlarged side elevational view of the connector; and

FIG. 9 is a top plan view of the connector.

DETAILED DESCRIPTION

Figure 1:
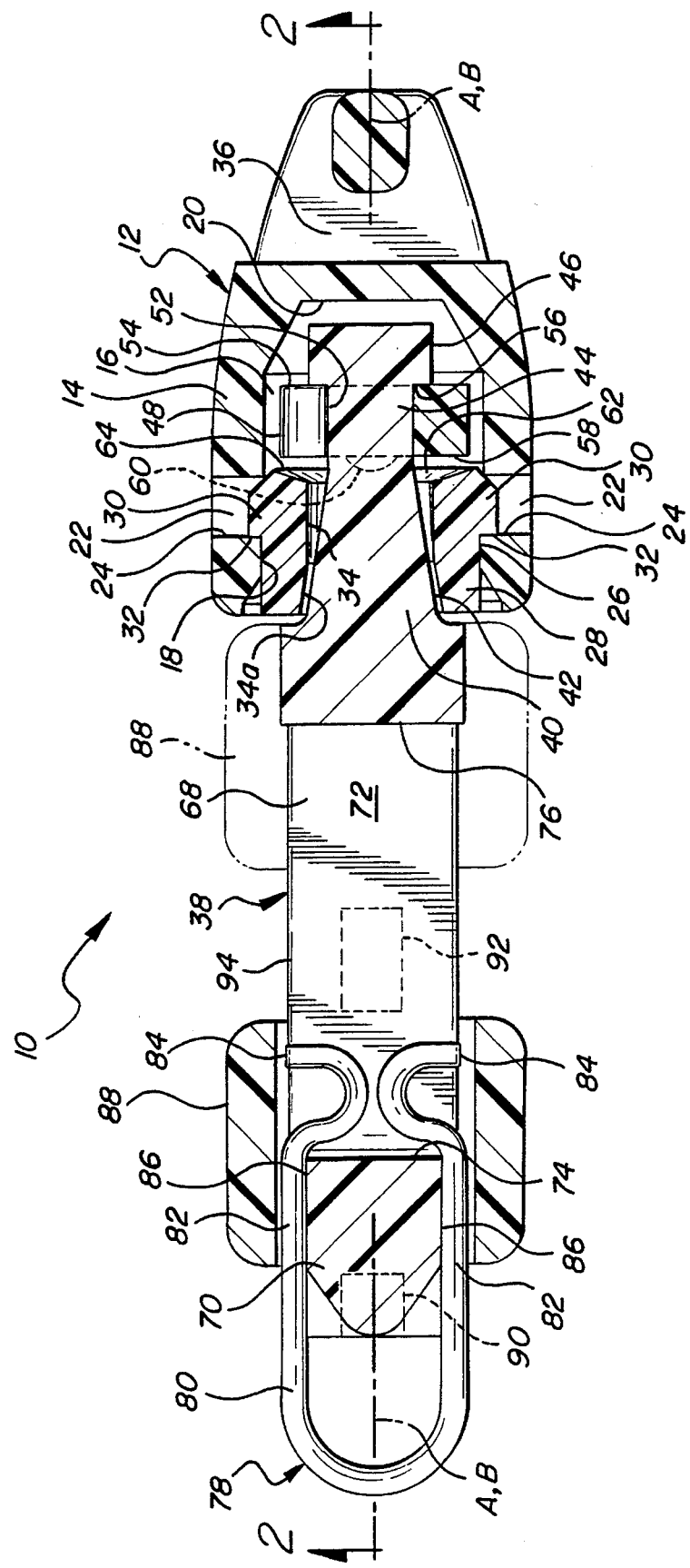
FIG. 1 is a front elevational view, partly in section, of an assembled swivel.

A swivel constructed in accordance with the presently preferred embodiment of the invention is indicated generally at 10 and comprises a housing member 12 having a generally cylindrical side wall 14 forming a cavity 16 at one end of the housing. The cavity 16 has an opening 18 which extends through one end of the housing 12 along an axis A. The cavity is closed at its opposite end by an end wall 20. A pair of diametrally opposed windows 22 extend through the side wall 14 in communication with the cavity 16 adjacent the opening 18 and present transverse latch shoulders or keepers 24.

Removably accommodated in the cavity 16 is a journal 26 having a cylindrical wall 28 fitted into the opening 18 and retained in place by a pair of radially extending latch fingers 30 projecting into each of the windows 22. Each finger 30 has a latching lug 32 projecting radially outwardly of the wall 28 and confronting the shoulders 24 of the windows 22 for removably latching the journal 26 within the cavity 16. The journal 26 has a central opening 34 concentric with but smaller than the opening 18 and provided at one end with a flared mouth 34a. At the closed end of the housing is an eye 36 that is adapted to be coupled to a first fishing tackle element such as a fishing line.

An elongate body member 38 is adapted to be coupled to a second fishing tackle unit, such as a lure, as will be explained further below. The body member 38 is shaft-like and has a longitudinal axis B which, when assembled with the housing 12, is coaxial with the axis A. A spindle 40 is provided at one end of the body 38 and extends through the opening 34 of the journal 26 into the cavity 16. The spindle has a reduced diameter shank 44 extending through the opening 34 and a tapered portion 42 at one end complementary to the flared surface 34a. The body 38 terminates at its other end in an enlarged head 46 that is accommodated in the cavity 16.

A U-shaped retainer 48 has a radial slot 50 therein having an arcuate inner surface 52 formed on a radius corresponding substantially to that of the spindle 44. The slot 50 has a width dimension slightly less than that of the spindle 44 which enables the retainer to be snap-fitted onto the spindle between the head 46 and the journal 12. The radius on which the surface 52 is formed is smaller in diameter than that of the head 46 so that one end face 54 of the retainer 48 confronts an inner shoulder 56 of the head 46 to maintain the retainer 48 on the spindle 44.

The opposite end face 58 of the retainer 48 includes a pair of circumferentially spaced, hemispherical projections or bearings 60 which confront a conical bearing surface 62 formed on the inner end face 64 of the journal 26. The surface 62 is concentric with the axis A, and the projections 62 are concentric with the axis B.

The body member 38 has a cylindrical portion 68 terminating in a free end 70. The portion 68 has an elongate slot 72 therein that is closed at its ends by walls 74 and 76. A generally U-shaped spring clip 78 is connected to the free end of the portion 68 for the attachment of a fishing tackle element, such as a lure (not shown). The clip 78 is formed of stainless steel wire and has a loop 80 projecting beyond the free end of the portion 68 and laterally spaced legs 82 straddling the portion 68 and terminating at laterally adjacent end portions 84 which are accommodated in the slot 72. The legs 82 are accommodated in a pair of channels 86 that extend from the slot to the free end 70 to provide lateral stability to the clip 78.

An annular locking sleeve 88 is slidable longitudinally along the portion 68 from an open position shown in chain lines in FIG. 1 to a closed position shown in full lines. The sleeve may be releasably locked in its closed position by axially and circumferentially spaced sets of retaining lugs 90 and 92 projecting radially from the shaft on opposite ends of the sleeve 88. The lugs 90 are at the free end 70, whereas the lugs 92 flank the slot 72. The walls 94 on opposite sides of the slot are resilient and deflect inwardly upon application of a radially inward force on the sides 94.

When the sleeve 88 is in the open position, the user may attach a tackle item to the clip 78 by inserting one of the ends 84 through the eye of the tackle item and sliding the tackle item toward the loop 80, causing the associated leg 82 of the clip 78 to be deflected out of its channel 86 by an amount sufficient to permit the passage of the tackle item. The resiliency of the spring steel restores the leg to its normal condition after passage of the tackle item. The sleeve 88 may then be slid bodily to the left as viewed in FIG. 1 whereupon the sleeve 88 will engage the camming surfaces 96 of the lugs 92 causing the walls 94 and the lugs 92 to be deflected inwardly allowing the sleeve 88 to be slid over and past the lugs 92 into the closed position. When in such closed position, the sleeve 88 overlies the legs 82 and ends 84 of the spring clip 78 and limits their outward deflection to prevent inadvertent removal of the tackle item.

The tackle item may be removed by reversing the procedural steps described above in which the sleeve 88 may be moved from the closed position to the open position by pinching the walls 94 toward one another and causing the lugs 92 to deflect inwardly by an mount necessary to enable the sleeve 88 to be slid over and past the lugs 92 to the open position.

The open position of the sleeve 88 also permits the user to remove the spring clip 78 from the body portion 68 after which the tackle item may be threaded onto the loop portion 88 over one of the ends 84 of the clip and thereafter reattached to the portion 68 in the position illustrated in FIG. 1, and retained by moving the sleeve 88 to the closed position in the manner described previously.

FIG. 3 illustrates an alternative embodiment of a spring clip 78' mounted on the body portion 68. The clip 78' has the same general U-shape providing a similar loop portion 80' with legs 82' straddling the portion 68 and accommodated in the channels 86 and terminating at end portions 84' accommodated in the slot 72 The end portions 84' however, are of a different configuration than those of the first embodiment.

Once accommodated in the slot 72, the configuration of the end portions 84' makes it difficult to remove the spring clip 78' from the portion 68 but enables the fishing tackle item to be coupled to and removed from the spring clip 78 in the same manner as that described above for the first embodiment.

If the various parts are disassembled from one another, they may be assembled in the following manner. The sleeve 88 may be assembled with the connector 38 by sliding the sleeve 88 over the spindle 40 and onto the body portion 68. The journal 26 then may be slid past the head 46 onto the spindle 40 and retained by reaction of the retainer 48 with the head 46 and the journal 26. The subassembly of the spindle 40, the journal 26, and the retainer 48 then may be extended axially into the cavity 16 of the housing 12 through the opening 18 to the point where the latch fingers 30 of the journal 26 snap into the windows 22, as illustrated in FIG. 1. The journal 26 and the wall 28 of the housing 12 are sufficiently resilient to enable the wall to deflect radially inwardly and permit the passage of the latch fingers 30 through the opening 18 en route to reception in the windows 22, after which the components are restored automatically by their resiliency to their undeflected condition shown in FIGS. 1 and 2 to retain the fingers 30 releasably in the windows. The spring clip 78 or 78' then may be attached to the shaft and a fishing tackle item coupled to the clip in the manner previously described. The swivel then may be attached to a fishing line by threading the line through the eye 36 of the body and tying a knot.

Tensile force applied to the swivel 10 via the members 12 and 38 imposes stress on the latching fingers 30 which, in some instances, may be sufficient to cause the fingers to be displaced radially inward and uncouple the housing 12 from the journal 26. However, such tensile force also causes the projections 60 of the retainer 48 to bear forcibly on the conical bearing surface 62 of the journal 26 and resist any tendency on the part of the fingers 30 to contact radially and be withdrawn from the windows 22. Since the bearings 60 are hemispherical, their engagement with the bearing surface 62 remains substantially a point contact, and within the cone defined by the surface 62, thereby avoiding the imposition of frictional forces between the bearings and the bearing surfaces which appreciably oppose rotation between the relatively rotatable parts of the swivel.

No tools of any kind are required to assemble the several components of the swivel construction nor is it necessary to utilize any tools to connect the swivel to a fishing line or a tackle item.

The disclosed embodiment is representative of a presently preferred form of the invention, but is intended to be illustrative rather than definitive thereof. The invention is defined in the claims.

I claim:

1. A swivel construction comprising an elongate body member having an enlargement at one end; a housing member having a cavity in which said one end of said body member is accommodated; journal means in said cavity encircling said body member; retaining means carried by said body member between said journal means and said enlargement; latch means cooperable between said journal means and said housing member for coupling and uncoupling said journal means to and from said housing member; first means carried by said body member at its opposite end for connection to a first fishing tackle element; second means carried by said housing member for connection to a second fishing tackle element, said first and second means being operable to apply a tensile force on said members tending to stress said latch means; and bearing means comprising projections on said retaining means and a conical surface on said journal means engageable by said projections in response to the application of tensile force on said members to resist uncoupling of said latch means from said housing member.

2. The construction according to claim 1 wherein said body member has a cylindrical portion adjacent said enlargement and wherein said retaining means comprises a C-shaped member having an arcuate wall, said wall having an opening therein through which said cylindrical portion may pass.

3. The construction according to claim 2 wherein said cylindrical portion has a dimension greater than that of said opening, said C-shaped member being sufficiently resilient as to enable said cylindrical portion to pass through said opening.

4. The construction according to claim 1 wherein said projections have hemispherical surfaces.

5. The construction according to claim 1 wherein said body member has an elongate slot therein through which said first means extends.

6. The construction according to claim 5 wherein said body member is sufficiently flexible on opposite sides of said slot to enable such opposite sides to be pinched toward one another.

7. The construction according to claim 6 including a lock member encircling said body member for sliding movement along a path longitudinal of said slot, and a lug projecting outwardly of said body member from one of said sides into the path of movement of said lock member, said lug being displaceable from said path in response to pinching of said sides toward one another.

8. The construction according to claim 7 wherein said lug has at one end thereof a camming surface engageable by said lock member for displacing said lug from said path in response to movement of said lock member in one direction relative to said body member.

9. A swivel assembly for attaching a fishing tackle element to a fishing line, said assembly comprising a housing member having a cavity therein; a body terminating at one end in an enlargement accommodated in said cavity, said body being rotatable relative to said housing member about an axis; an annular journal member removably accommodated in said cavity and encircling said body; a retainer carried by said body between said enlargement and said journal member; cooperable latch means on said housing member and said journal member for resisting removal of said journal member from said cavity; first means for attaching a fishing tackle element to one end of said assembly; and second means for attaching a fishing line to the opposite end of said assembly, said first and second means being operable to apply tensile force on said assembly tending to stress said latch means toward removal from said cavity, said journal member and said retainer having camming surfaces operable engageable in response to the application of tensile force on said assembly to act on said latch means in opposition to said stress and secure said journal member against removal from said cavity.

10. The swivel according to claim 9 wherein said latch means comprises resilient latch fingers on one of said members and latch keepers on the other of said members, said latch fingers engaging said latch keepers when said journal member is accommodated in said cavity.

11. The swivel according to claim 9 wherein said latch means comprises resilient latch fingers on said journal member and openings in said housing member into which said latch fingers project.

12. The swivel according to claim 11 wherein said engageable surfaces are so shaped that engagement between said surfaces reinforces said latch fingers against movement in a direction to remove said fingers from said openings.

13. The swivel according to claim 12 wherein one of said surfaces is conical and the other of said surfaces is spherical and engages said one of said surfaces within the cone of said conical surface.

14. A fishing tackle swivel construction comprising an elongate body having means at one end for connection to a first tackle element; a housing having a cavity therein and means at one end of thereof for connection to a second tackle element, said housing having at its opposite end an opening in communication with said cavity and through which said body extends into said cavity, said body having adjacent its other end a cylindrical spindle flanked on one side by an enlargement and on the other side by a tapered bearing surface; a journal encircling said tapered bearing surface and journalling said body for rotation about an axis; a retainer encircling said spindle; and latch fingers carried by said journal and extending radially outward of said axis into engagement with latch keepers carried by said housing, said fingers being flexible radially of said axis, said retainer and said journal having confronting surfaces operable in response to the application of tensile force on said body and said housing for applying a radially outward force on said fingers to resist radial inward movement of said fingers relative to said keepers.

15. A swivel construction comprising an elongate body member having an enlargement at one end; a housing member having a cavity in which said one end of said body member is accommodated; journal means in said cavity encircling said body member; retaining means carried by said body member between said journal means and said enlargement; latch means cooperable between said journal means and said housing member in a first position for coupling said journal means to said housing member and movable toward a second position for uncoupling said journal means from said housing member; first means carried by said body member at its opposite end for connection to a first fishing tackle element; second means carried by said housing member for connection to a second fishing tackle element, said first and second means being operable to apply a tensile force on said members tending to stress said latch means when in said first position toward movement to said second uncoupled position; and bearing means reacting in opposition to said stress on said latch means between said journal means and said retaining means in response to the application of said tensile force to resist uncoupling of said latch means from said housing member.

* * * * *